United States Patent
Shikata et al.

[11] Patent Number: 5,830,819
[45] Date of Patent: Nov. 3, 1998

[54] ALUMINA SINTERED PRODUCT

[75] Inventors: Kunihide Shikata; Kenichi Nagae; Toshihiko Uemura, all of Kokubu; Masaki Hayashi, Gamou-cho; Tsuneo Muchi, Tokyo, all of Japan

[73] Assignees: Kyocera Corporation; Sony Corporation, both of Tokyo, Japan

[21] Appl. No.: 424,782

[22] Filed: Apr. 19, 1995

[30] Foreign Application Priority Data

Apr. 20, 1994 [JP] Japan ........................... 6-81265
Aug. 29, 1994 [JP] Japan ........................... 6-203426

[51] Int. Cl.$^6$ ................................ C04B 35/10
[52] U.S. Cl. .......................... 501/153; 501/127
[58] Field of Search ..................... 501/127, 153, 501/121, 118, 123, 129, 126

[56] References Cited

U.S. PATENT DOCUMENTS 3,791,833  2/1974  Sugiura et al. ................... 501/153
4,866,016  9/1989  Ando et al. ...................... 510/134

FOREIGN PATENT DOCUMENTS 7260182T   3/1972   WIPO .
7650757X   5/1976   WIPO .
7687712X  10/1976   WIPO .
86090729   2/1986   WIPO .
88281264   8/1988   WIPO .
91225272   6/1991   WIPO .

*Primary Examiner*—Melissa Bonner
*Attorney, Agent, or Firm*—Loeb & Loeb LLP

[57] ABSTRACT

An aluminous sintered product comprising 70 to 96% by weight of an alumina component and 4 to 30% by weight of additives, said additives including at least the one selected from oxides of elements of the Group 5a of periodic table and at least the one selected from oxides of metals of the iron family and oxides of manganese, titanium, calcium, magnesium, chromium and silica, and said aluminous sintered product exhibiting a volume resistivity of from $1\times10^7$ to $1\times10^{13}$ Ω-cm over a temperature range of from 25° to 75° C. and an absolute value of the temperature coefficient of volume resistivity of not larger than 1.8%/°C. under the application of high voltages. The sintered product is used as antistatic part such as conveyer arm, handling jig, tweezers for holding wafers and the like that must not be electrostatically charged in an apparatus for producing semiconductors, and as resistance substrate, electrically conducting material, contact, heater, part in vacuum tubes, and part for electron guns in a CRT such as of TVs and the like.

4 Claims, 4 Drawing Sheets

ALUMINA SINTERED PRODUCT

BACKGROUND OF THE INVENTION

1. Field of the Invention

The present invention relates to an aluminous sintered product comprising alumina as a chief component. More specifically, the invention relates to an aluminous sintered product used as an antistatic part such as conveyer arm, handling jig, tweezers for holding wafers, etc. that must not be electrically charged in, for example, an apparatus for producing semiconductors, and is further used as resistance substrate, electrically conducting material, contact, heater, part in vacuum tubes, in projectors of the projection type and reflection type, and is further used as a material for electron guns of CRTs in household TVs, displays and index-type TVs.

2. Description of the Prior Art

A ceramic having a volume resistivity of, for example, $1 \times 10^7$ to $1 \times 10^{13}$ Ω-cm which is between that of an electric insulator and that of an electric conductor has heretofore been used as an antistatic part (e.g., conveyer arm, etc. that must not be electrostatically charged in, for example, an apparatus for producing semiconductors) and as resistance substrate, electrically conducting material, contact, heater, surrounding wall of vacuum tubes, and the like.

An aluminous sintered product has been known as a ceramic of this kind. The aluminous sintered product of this kind has heretofore been produced by adding powders of an alkali metal, titanium or oxides thereof to an alumina powder, dry-mixing or wet-mixing them together, molding the mixture while adding, as required, a molding assistant thereto, followed by sintering in a reducing atmosphere in order to obtain a desired resistivity.

When this aluminous sintered product is used over a range of from room temperature to a high-temperature range, however, the volume resistivity decreases with a rise in the temperature. When the aluminous sintered product is used as an electric resistance substrate, for example, the resistance varies to a large degree depending upon the temperature. Furthermore, the volume resistivity increases with a decrease in the temperature, making it difficult to obtain desired antistatic effect.

That is, in the conventional aluminuous sintered product, the temperature coefficient of volume resistivity is as large as about 2%/°C. over a range of from 25° to 75° C. arousing a problem of a large change in the volume resistivity with respect to the temperature. Here, the temperature coefficient TCR of volume resistivity (%/°C.) is calculated according to an equation TCR (%/°C.)=$[(R_{25}-R_{75})/(R_{25} \times 50)] \times 100$, wherein $R_{25}$ is a volume resistivity at 25° C. and $R_{75}$ is a volume resistivity at 75° C.

Figure 2:
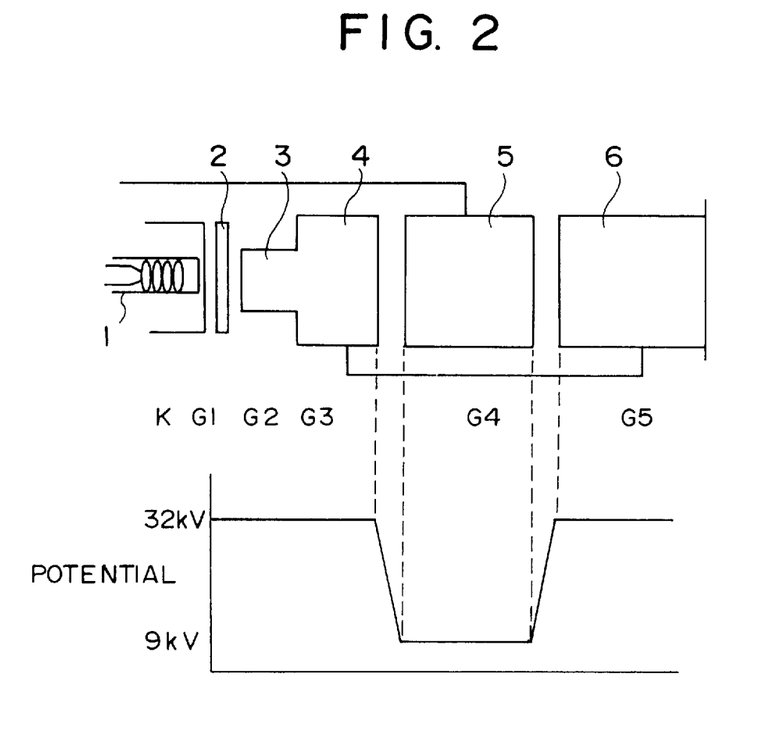
FIG. 2 is a diagram schematically illustrating a conventional electron gun.

An electron gun used in the CRTs has heretofore been constituted, as shown in FIG. 2, by arranging a plurality of cylindrical electrodes in the axial direction maintaining a predetermined distance.

In FIG. 2, reference numeral 1 denotes a cathode, and reference numerals 2 to 6 denote cylindrical electrodes G1 to G5.

The cylindrical electrodes 3, 4 and 6 are electrically connected together and are impressed with a positive voltage. The cylindrical electrode is impressed with a voltage lower than that of the cylindrical electrodes 3, 4 and 6. The cylindrical electrodes 3 to 6 contain lenses for bending electron rays.

In such an electron gun, a high voltage is applied among the electrodes, an electron ray is emitted from the cathode 1 into the cylindrical electrodes 2 to 6, and is bent while passing through the cylindrical electrodes 2 to 6, and arrives at the surface of a cathode-ray tube.

In the conventional electron gun, however, the cylindrical electrodes 2 to 6 are arranged in vacuum maintaining a predetermined distance and are insulated from each other. As shown in a graph of FIG. 2, therefore, a sharp potential gradient develops between the cylindrical electrode 4 and the cylindrical electrode 5, and between the cylindrical electrode 5 and the cylindrical electrode 6, resulting in an increase in the spherical aberration of lenses formed in the cylindrical electrodes 3 to 5. Accordingly, a visual spot size (hereinafter abbreviated as VSS occasionally) on the surface of the cathode-ray tube is still large, and satisfactory vividness is not obtained.

The present inventors have conducted keen study in an attempt to obtain a sintered product which has a volume resistivity of between that of an electrically conducting material and that of an insulating material such as the above-mentioned antistatic parts and of which the resistivity does not much change depending upon the temperature, and have discovered that the above-mentioned requirements are satisfied by an aluminous sintered product which comprises alumina as a chief component and a plurality of predetermined additives of particular metal oxides. Based upon this discovery, the present inventors have learned that the above-mentioned sharp potential gradient taking place between the electrodes could be favorably relaxed and spherical aberration of lenses formed in the electrodes can be eliminated if the aluminous sintered product is inserted among the cylindrical electrodes of the electron gun, and have thus completed the present invention.

SUMMARY OF THE INVENTION

An object of the present invention therefore is to provide a particular aluminous sintered product having a volume resistivity which lies within a particular range and a temperature coefficient of volume resistivity which is not larger than a particular value.

Another object of the present invention is to provide an aluminous sintered product that is suited for use as antistatic parts, resistance substrates, electrically conducting materials, contacts, heaters, walls surrounding vacuum tubes, etc.

A further object of the present invention is to provide a particular aluminous sintered product suited for use as a material for electron guns, maintaining a volume resistivity lying within a particular range and a temperature coefficient of volume resistivity of not larger than a particular value even under the application of high voltages.

According to the present invention, there is provided an aluminous sintered product comprising 70 to 96% by weight of an alumina component and 4 to 30% by weight of additives, said additives including at least the one selected from oxides of elements of the Group 5a of periodic table and at least the one selected from oxides of metals of the iron family and oxides of manganese, titanium, calcium, magnesium, chromium and silica, and said aluminous sintered product exhibiting a volume resistivity of from $1 \times 10^7$ to $1 \times 10^{13}$ Ω-cm over a temperature range of from 25° to 75° C. and an absolute value of the temperature coefficient of volume resistivity of not larger than 1.8%/°C. under the application of high voltages.

According to an aspect of the present invention, furthermore, there is provided an aluminuous sintered product wherein the additives include vanadium pentoxide, titanium oxide and at least the one selected from calcium oxide, chromium oxide, cobalt oxide, magnesium oxide, silica, manganese oxide and iron oxide, the vanadium pentoxide being contained in an amount of from 0.1 to 1.0% by weight, the titanium oxide being contained in an amount of from 1 to 20% by weight, and the remainder being at least the one selected from calcium oxide, chromium oxide, cobalt oxide, magnesium oxide, silica, manganese oxide, and iron oxide.

According to another aspect of the present invention, there is provided an aluminous sintered product wherein the alumina component is contained in an amount of from 70 to 93% by weight and the additives are contained in amounts of from 7 to 30% by weight, the additives including at least one of the oxides of elements of the Group 5a of periodic table, at least one of the oxides of metals of the iron family, and manganese dioxide, and wherein when the total amount of the additives is regarded to be 100% by weight, the oxide of the element of the Group 5a of periodic table is contained in an amount of from 3 to 40% by weight, the oxide of the metal of the iron family is contained in an amount of from 5 to 80% by weight, and manganese dioxide is contained in an amount of from 15 to 90% by weight.

PREFERRED EMBODIMENTS OF THE INVENTION

The sintered product of the present invention comprises alumina as a chief component and additives which include at least the one selected from the oxides of elements of the Group 5a of periodic table or, concretely speaking, the one selected from the oxides of vanadium, niobium and tantalum, and at least the one selected from the oxides of metals of the iron family such as iron, cobalt and nickel and oxides of manganese, titanium, calcium, magnesium, chromium and silica. The sintered product of the invention is obtained by molding a mixture of the alumina component powder and the additive powders into any desired shape by any desired molding means, or by molding a mixture of powders of hydroxides of the above components and powders of carbonates of the above components that can be changed into the above-mentioned materials during the firing into any desired shape by any desired molding means followed by sintering in an oxidizing atmosphere. The thus obtained sintered product exhibits a volume resistivity of from $1 \times 10^7$ to $1 \times 10^{13}$ $\Omega$-cm over a temperature range of from 25° to 75° C. under the application of a high voltage and an absolute value of the temperature coefficient of volume resistivity of not larger than 1.8%/°C.

As mentioned above, the aluminous sintered product of the present invention has a volume resistivity which lies between that of an insulator and that of an electric conductor, and has a small absolute value of the temperature coefficient of volume resistivity. Therefore, the aluminuous sintered product of the present invention can be favorably used as antistatic part, resistance substrate, electrically conducting material, contact, and material for relaxing potential gradient among the electrodes in an electron gun in the CRT and the like.

Among the aluminous sintered products of the present invention, the aluminous sintered product which contains the alumina component in an amount of 70 to 96% by weight and additives in amounts of 4 to 30% by weight, the additives including 0.1 to 1.0% by weight of vanadium pentoxide, 1 to 20% by weight of titanium oxide, and the rest of at least the one selected from calcium oxide, chromium oxide, cobalt oxide, magnesium oxide, silica, manganese oxide and iron oxide, exhibits the volume resistivity and the temperature coefficient of volume resistivity that do not change even under the application of high voltages, and is particularly useful for the electron guns.

In the aluminuous sintered product of this aspect, when the amount of alumina is smaller than 70% by weight, the volume resistivity becomes smaller than $1 \times 10^7$ $\Omega$-cm and approaches that of an electric conductor. When the aluminous sintered product is used as a resistance ceramic for connecting the cylindrical electrodes in the electron gun, therefore, the cylindrical electrodes become electrically conducting to each other, and desired potential differences are no longer maintained.

When the amount of alumina is larger than 96% by weight, on the other hand, the volume resistivity becomes larger than $1 \times 10^{13}$ $\Omega$-cm and approaches that of an insulator. When the aluminuous sintered product is used as a resistance ceramic for connecting the cylindrical electrodes in the electron gun, therefore, it is electrostatically charged so that potentials lose stability among the cylindrical electrodes.

When the amount of titanium oxide is smaller than 1% by weight, the volume resistivity tends to become larger than $1 \times 10^{13}$ $\Omega$-cm which is not desirable.

When the amount of titanium oxide is larger than 20% by weight, the volume resistivity becomes smaller than $1 \times 10^7$ $\Omega$-cm which is close to that of an electric conductor and is not desirable.

Moreover, when the amount of vanadium pentoxide is smaller than 0.1% by weight, the temperature coefficient of volume resistivity exceeds 1.8%/°C., whereby the volume resistivity increases relative to the temperature. When the aluminous sintered product is used as a resistance ceramic for connecting the electrodes in an electron gun, therefore, the spherical aberration of the lenses changes due to a difference in the temperature. When the amount of vanadium pentoxide exceeds 1.0% by weight, on the other hand, the volume resistivity becomes smaller than $1 \times 10^7$ $\Omega$-cm.

Moreover, the remainder is selected from at least one of calcium oxide, chromium oxide, cobalt oxide, magnesium oxide, silica, manganese oxide and iron oxide. This is because, the addition of these compounds makes it possible to control the firing temperature.

In the aluminous sintered product for electron guns of the present invention, it is desired that alumina is contained in an amount of from 75 to 85% by weight, titanium oxide is contained in an amount of from 3.0 to 15.0% by weight, vanadium pentoxide is contained in an amount of from 0.2 to 0.3% by weight, and at least one of calcium oxide, chromium oxide, cobalt oxide, magnesium oxide, silica, manganese oxide or iron oxide is contained in an amount of from 3.0 to 20.0% by weight.

The aluminous sintered product for electron guns is obtained by using, for example, an alumina powder, a titanium oxide powder, a vanadium pentoxide powder, a calcium oxide powder, a chromium oxide powder, a cobalt oxide powder, a magnesium oxide powder, a silica powder, a manganese oxide powder and an iron oxide powder, or using powders of hydroxides of the above materials or powders of carbonates of the above materials that can be changed into the above-mentioned materials during the firing, mixing these powders together, molding the mixture into a predetermined shape by any desired molding means, and firing the molded article in an oxidizing atmosphere at a temperature of 1300° to 1600° C. for 1 to 3 hours. The starting powders may be mixed together in a dry form. When mixed together in a wet form, however, the powders are granulated by spray-drying and are molded.

When the powders are pulverized and mixed together by using a ball mill or the like, calcium oxide, chromium oxide, cobalt oxide, magnesium oxide, silica, manganese oxide or iron oxide may infiltrate from the balls without, however, arousing any problem provided the composition lies within the aforementioned range.

In the aluminous sintered product for electron guns of the present invention, the volume resistivity is controlled by chiefly controlling the content of alumina and controlling the content of titanium oxide, and the temperature coefficient of volume resistivity is controlled by controlling the content of vanadium pentoxide, whereby a volume resistivity of from about $1 \times 10^7$ to about $1 \times 10^{13}$ Ω-cm is exhibited over a temperature range of from 25° to 75° C. under the application of high voltages, and an absolute value of the temperature coefficient of volume resistivity is suppressed to be not larger than 1.8%/°C.

By connecting the cylindrical electrodes together by using the above-mentioned aluminuous sintered product in the electron gun, the potential gradient can be relaxed among the cylindrical electrodes, and VSS can be decreased on the surface of the cathode-ray tube.

Among the aluminous sintered products of the present invention, an aluminous sintered product is particularly useful as antistatic part, resistance substrate, electrically conducting material, contact, heater and material of vacuum tubes, electron gun when it comprises 70 to 93% by weight of alumina component, and 7 to 30% by weight of additives, the additives including, when the total amount of the additives is regarded to be 100% by weight, 15 to 90% by weight of manganese dioxide, at least the one selected from 3 to 40% by weight of oxides of elements of the Group 5a of periodic table and at least the one selected from 5 to 80% by weight of oxides of metals of the iron family.

In the aluminous sintered product of this aspect, when the content of alumina is smaller than 70% by weight, the volume resistivity becomes smaller than $1 \times 10^7$ Ω-cm which is close to that of an electric conductor.

When the content of alumina is larger than 93% by weight, the volume resistivity becomes larger than $1 \times 10^{13}$ Ω-cm which is close to that of an insulator.

In order to obtain a sintered product suited for the above-mentioned applications having a volume resistivity lying between that of an insulator and that of an electric conductor, it is desired that alumina is contained in an amount of from 75 to 85% by weight and, particularly, in an amount of from 80 to 93% by weight from the standpoint of obtaining large ceramic strength and firing property.

Manganese dioxide is included in the additives because of the reason that it helps improve sintering property, enables the product to be fired at relatively low temperatures, and makes it possible to obtain a desired volume resistivity. Here, when the amount of the additives is regarded to be 100% by weight, manganese dioxide is contained in an amount of from 15 to 90% by weight. This is because when the amount of manganese dioxide is smaller than 15% by weight, the volume resistivity becomes larger than $1 \times 10^{13}$ Ω-cm which is close to that of an insulator. When the amount of manganese dioxide is larger than 90% by weight, on the other hand, the volume resistivity becomes smaller than $1 \times 10^7$ Ω-cm which is close to that of an electric conductor. From the standpoint of obtaining a volume resistivity of from $1 \times 10^7$ to $1 \times 10^{13}$ Ω-cm, it is desired that manganese dioxide is contained in an amount of from 18 to 85% by weight and, particularly, from 30 to 80% by weight. From the standpoint of sintering property of the ceramic, it is desired that manganese dioxide is contained in an amount of from 30 to 90% by weight.

Furthermore, the additives include at least one of the oxides of elements of the Group 5a of periodic table from the standpoint of obtaining a desired volume resistivity and decreasing the temperature coefficient of volume resistivity. When the additives are expressed in terms of a weight ratio, at least one of the oxides of elements of the Group 5a of periodic table is contained in an amount of from 3 to 40% by weight. This is because, when its amount is smaller than 3% by weight, an absolute value of the temperature coefficient of volume resistivity becomes larger than 1.8%/°C. and the volume resistivity increases relative to the temperature. When its amount is larger than 40% by weight, on the other hand, the volume resistivity becomes smaller than $1 \times 10^7$ Ω-cm which is close to that of an electric conductor. From the standpoint of decreasing the volume resistivity and obtaining a desired volume resistivity, it is desired that the oxide of an element of the Group 5a of periodic table is contained in an amount of from 3.5 to 30% by weight and, particularly, from 3.5 to 25% by weight. Elements of the Group 5a of periodic table include vanadium, niobium and tantalum and in which niobium is particularly preferred.

Moreover, the additives include at least one of the oxides of metals of the iron family from the standpoint of obtaining a desired volume resistivity. When the additives are expressed in terms of a weight ratio, at least one of the oxides of metals of the iron family is contained in an amount of from 5 to 80% by weight. This is because, when its amount is smaller than 5% by weight, the volume resistivity becomes larger than $1 \times 10^{13}$ Ω-cm which is close to that of an insulator. When its amount is larger than 80% by weight, on the other hand, the volume resistivity becomes smaller than $1 \times 10^7$ Ω-cm which is close to that of an electric conductor. From the standpoint of obtaining a desired volume resistivity, it is desired that oxides of metals of the iron family are contained in amounts of from 10 to 80% by weight and, particularly, from 10 to 60% by weight. Metals of the iron family include iron, cobalt and nickel and in which iron is particularly preferred.

In this aspect of the present invention, it is most desired that the aluminous sintered product comprises 80 to 85% by weight of alumina and 15 to 20% by weight of additives, the additives including 26 to 65% by weight of manganese dioxide, 27 to 65% by weight of iron oxide, and 5 to 15% by weight of niobium oxide.

According to the present invention, it is desired that a volume resistivity of from $1 \times 10^9$ to $1 \times 10^{12}$ -cm is exhibited over a temperature range of from 25° to 75° C. and that the temperature coefficient of volume resistivity is not larger than 1.6%/°C. over a temperature range of from 25° to 75° C.

The above-mentioned aluminous sintered product is obtained by sing, for example, an alumina powder, a manganese dioxide powder, a powder of an oxide of an element of the Group 5a of periodic table, and a powder of an oxide of a metal of the iron family, or by using powders of hydroxides or carbonates of the above-mentioned materials that can be changed into the above-mentioned materials during the firing, mixing these powders together, molding the mixture into any shape by any desired molding means, and firing the molded article in an oxidizing atmosphere at 1200° to 1500° C. for 1 to 3 hours. The starting powders may be mixed together in a dry form. When mixed together in a wet form, however, the powders are granulated by spray-drying and are molded.

When the powders are pulverized and mixed together by using a ball mill or the like, calcium oxide, chromium oxide, cobalt oxide, magnesium oxide, silica, manganese oxide or iron oxide may infiltrate from the balls without, however, arousing any problem provided the composition lies within the aforementioned range.

In the aluminous sintered product according to this aspect of the present invention, the volume resistivity of from about $1 \times 10^7$ to $1 \times 10^{13}$ Ω-cm is obtained over a temperature range of from 25° to 75° C. and the temperature coefficient of volume resistivity is suppressed to be not larger than 1.8%/°C. over a temperature range of from 25° to 75° C. by chiefly controlling the content of alumina and the contents of additives and, particularly, by controlling the amount of an oxide of an element of the Group 5a of periodic table, the amount of manganese dioxide and the amount of an oxide of a metal of the iron family that constitute the additives.

The invention will now be described by way of working examples.

EXAMPLE 1

First, an alumina powder, a titanium oxide powder, a vanadium pentoxide powder, a calcium carbonate powder, a chromium oxide powder, a cobalt oxide powder, a magnesium carbonate powder, a silica powder, a manganese oxide powder and an iron oxide powder were prepared, were weighed such that the compositions of sintered products thereof were as shown in Table 1, and were wet-mixed together using a rotary mill to prepare slurries which were then spray-dried to obtain starting materials for sintering. The starting materials were press-molded and were fired in the open air at 1400° to 1600° C. for two hours in order to obtain disk-like sintered products having a diameter of 60 mm and a thickness of 3 mm. Both ends of the sintered products were polished so that the samples possessed a thickness of 2 mm.

TABLE 1

| Sample No. | Composition (% by weight) | | | | | | | | | | Firing temperature (°C.) |
| --- | --- | --- | --- | --- | --- | --- | --- | --- | --- | --- | --- |
| | $Al_2O_3$ | $TiO_2$ | $V_2O_5$ | CaO | $Cr_2O_3$ | $Co_3O_4$ | MgO | $SiO_2$ | $MnO_2$ | $Fe_2O_3$ | |
| 1 | 75.0 | 18.0 | 0.2 | — | 2.0 | 0.3 | — | 1.5 | 3.0 | — | 1400 |
| 2 | 90.0 | 2.0 | 0.3 | — | 2.0 | 0.3 | — | 1.4 | 4.0 | — | 1400 |
| 3 | 82.0 | 10.0 | 0.2 | — | 2.0 | 0.3 | — | 1.5 | 4.0 | — | 1400 |
| 4 | 93.0 | 3.0 | 1.0 | 0.5 | 2.0 | — | — | 0.5 | — | — | 1550 |
| 5 | 93.0 | 3.0 | 1.0 | — | — | — | 1.0 | — | — | 2.0 | 1550 |
| 6 | 90.0 | 2.0 | 1.0 | — | 2.0 | 0.3 | — | 0.7 | 4.0 | — | 1400 |
| 7 | 90.0 | 2.0 | 0.1 | — | 2.0 | 0.3 | — | 1.6 | 4.0 | — | 1400 |
| *8 | 90.0 | 2.0 | — | — | 2.0 | 0.3 | — | 1.7 | 4.0 | — | 1400 |
| *9 | 68.0 | 25.0 | 0.2 | — | 2.0 | 0.3 | — | 1.5 | 3.0 | — | 1400 |
| 10 | 70.0 | 18.0 | 0.2 | — | 2.0 | 0.3 | — | 5.5 | 4.0 | — | 1400 |
| 11 | 96.0 | 1.5 | 0.3 | — | 2.0 | — | — | 0.2 | — | — | 1600 |
| 12 | 90.0 | 1.0 | 0.2 | — | 2.0 | 0.3 | — | 1.5 | 5.0 | — | 1400 |
| 13 | 75.0 | 20.0 | 0.2 | — | 2.0 | 0.3 | — | 2.5 | — | — | 1400 |
| *14 | 98.5 | 1.0 | 0.2 | — | — | — | — | 0.3 | — | — | 1600 |
| 15 | 90.0 | 2.0 | 0.6 | — | 2.0 | 0.3 | — | 1.1 | 4.0 | — | 1400 |
| *16 | 99.1 | — | — | — | — | — | 0.25 | 0.65 | — | — | 1500 |

Samples marked with * lie outside the scope of the present invention

Next, the samples were contained in a constant-temperature constant-humidity bath (humidity of 35%) based on a method of measuring insulation resistance specified under JIS C 2141, and a DC power source and an ammeter were connected to the electrodes on both surfaces of the samples. After the temperature in the constant-temperature constant-humidity bath has reached any desired temperature of 25° C., 50° C. or 75° C., the samples were left to stand for 10 minutes and, then, a voltage of 5 KV was applied to the samples for 5 minutes to read the leakage current. The resistance was found from the leakage current and the applied voltage in accordance with Ohm's law, and the volume resistivity was calculated from the resistance in order to find the temperature coefficient of volume resistivity. The volume resistivity was found according to $R = r \times S/t$ (R: volume resistivity, r: resistance, S: area of electrode, t: thickness of sample) as specified under JIS C 2141. The temperature coefficient TCR of volume resistivity (%/°C.) was found in compliance with TCR (%/°C.)=$[(R_{25}-R_{75})/(R_{25} \times 50)] \times 100$, where $R_{25}$ denotes a volume resistivity at 25° C. and $R_{75}$ denotes a volume resistivity at 75° C. The results were as shown in Table 2.

TABLE 2

| Sample No. | Volume resistivity (Ω-cm) | | | Temperature coefficient (%/°C.) |
| --- | --- | --- | --- | --- |
| | 25° C. | 50° C. | 75° C. | |
| 1 | $9.0 \times 10^9$ | $3.2 \times 10^9$ | $1.2 \times 10^9$ | 1.73 |
| 2 | $2.6 \times 10^{11}$ | $8.8 \times 10^{10}$ | $3.3 \times 10^{10}$ | 1.73 |
| 3 | $1.8 \times 10^{11}$ | $6.5 \times 10^{10}$ | $2.1 \times 10^{10}$ | 1.77 |
| 4 | $9.2 \times 10^{10}$ | $3.6 \times 10^{10}$ | $1.5 \times 10^{10}$ | 1.67 |
| 5 | $8.8 \times 10^{10}$ | $3.7 \times 10^{10}$ | $1.7 \times 10^{10}$ | 1.61 |
| 6 | $2.0 \times 10^8$ | $1.0 \times 10^8$ | $4.8 \times 10^8$ | 1.52 |

TABLE 2-continued

| Sample No. | Volume resistivity (Ω-cm) | | | Temperature coefficient (%/°C.) |
|---|---|---|---|---|
| | 25° C. | 50° C. | 75° C. | |
| 7 | $1.5 \times 10^{12}$ | $4.4 \times 10^{11}$ | $1.5 \times 10^{11}$ | 1.80 |
| *8 | $4.0 \times 10^{12}$ | $1.0 \times 10^{12}$ | $2.9 \times 10^{11}$ | 1.86 |
| *9 | $5.2 \times 10^{7}$ | $2.2 \times 10^{7}$ | $6.0 \times 10^{6}$ | 1.77 |
| 10 | $8.9 \times 10^{7}$ | $3.9 \times 10^{7}$ | $2.0 \times 10^{7}$ | 1.55 |
| 11 | $9.8 \times 10^{12}$ | $3.2 \times 10^{12}$ | $1.2 \times 10^{12}$ | 1.76 |
| 12 | $9.9 \times 10^{12}$ | $3.6 \times 10^{12}$ | $1.4 \times 10^{12}$ | 1.72 |
| 13 | $9.6 \times 10^{12}$ | $4.4 \times 10^{12}$ | $2.2 \times 10^{12}$ | 1.54 |
| 14 | $2.8 \times 10^{13}$ | $9.2 \times 10^{12}$ | $3.4 \times 10^{12}$ | 1.76 |
| 15 | $5.5 \times 10^{9}$ | $2.4 \times 10^{9}$ | $1.1 \times 10^{9}$ | 1.60 |
| *16 | $1.0 \times 10^{14}$ or larger at all temperature | | | 2.0 or larger |

Samples marked with * lie outside the scope of the invention

It will be understood from Table 2 that the aluminous sintered product of the present invention exhibits a volume resistivity of from $1 \times 10^7$ to $1 \times 10^{13}$ Ω-cm over a temperature range of from 25° to 75° C. under the application of high voltages and has an absolute value of the temperature coefficient of volume resistivity of not larger than 1.8%/°C.

On the other hand, samples lying outside the scope of the present invention such as samples Nos. 9 and 14 fail to exhibit volume resistivities that lie within a range of from $1 \times 10^7$ to $1 \times 10^{13}$ Ω-cm over the temperature range of from 25° to 75° C. Furthermore, the sample No. 8 has the temperature coefficient of volume resistivity of around 1.9%/°C. over the temperature range of from 25° to 75° C.

The present inventors have further found resistances of the sample No. 3 of when it was applied with voltages of 6 KV and 8 KV for 5 minutes, and calculated volume resistivities in the same manner as described above in order to find temperature coefficients of volume resistivities. As a result, when 6 KV was applied, the volume resistivities $R_{25}$ and $R_{75}$ were $17.8 \times 10^{10}$ Ω-cm and $2.0 \times 10^{10}$ Ω-cm, respectively, and when 8 KV was applied, the volume resistivies $R_{25}$ and $R_{75}$ were $17.6 \times 10^{10}$ Ω-cm and $1.9 \times 10^{10}$ Ω-cm, respectively. The temperature coefficients were 1.78%/°C. at 6 KV and 1.78%/°C. even at 8 KV.

Figure 1:
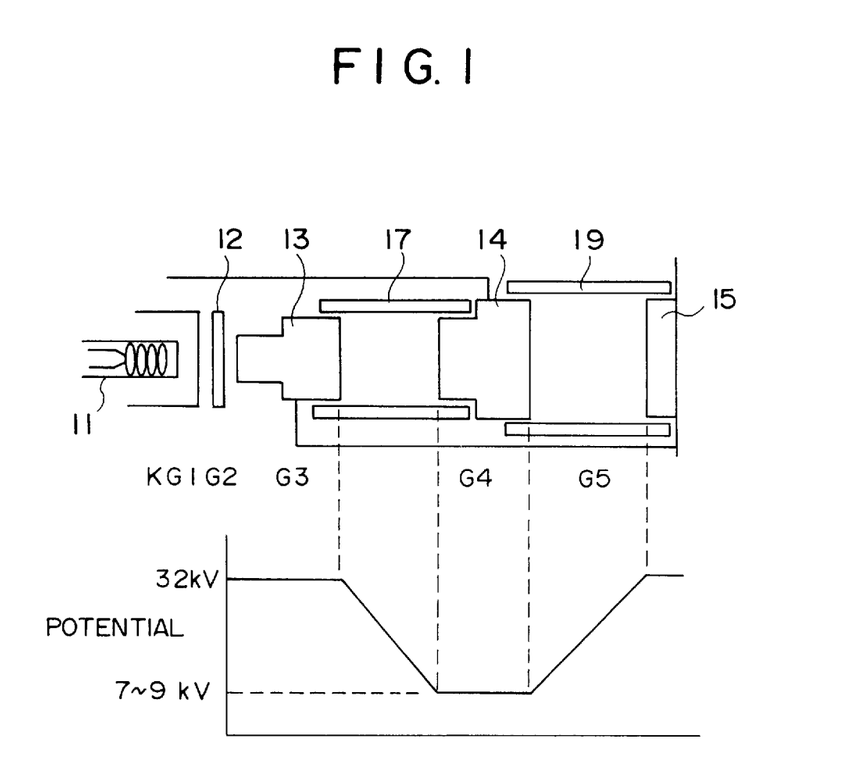
FIG. 1 is a diagram schematically illustrating an electron gun using an aluminous sintered product of the present invention.

Next, the present inventors have used the aluminous sintered product of the present invention as resistance ceramics 17 and 19 in an electron gun as shown in FIG. 1. Here, if the electron gun of FIG. 1 is explained, reference numeral 11 denotes a cathode irradiated with an electron ray. A plurality of cylindrical electrodes (12, 13, 14, 15) are arranged maintaining predetermined gaps in the axial direction in which the electron ray is emitted. The cylindrical electrode and the cylindrical electrode 14, and the cylindrical electrode 14 and the cylindrical electrode 15, are connected to each other via cylindrical resistance ceramics 17, 19 made of an aluminous sintered product, respectively. The cylindrical electrodes 13 and 14 are inserted in both end portions of the resistance ceramic 17, cylindrical electrodes 14 and 15 are inserted in both end portions of the resistance ceramic 19 and, thus, the cylindrical electrodes 13 and 14 are connected together, and the cylindrical electrodes 14 and 15 are connected together.

Figure 3:
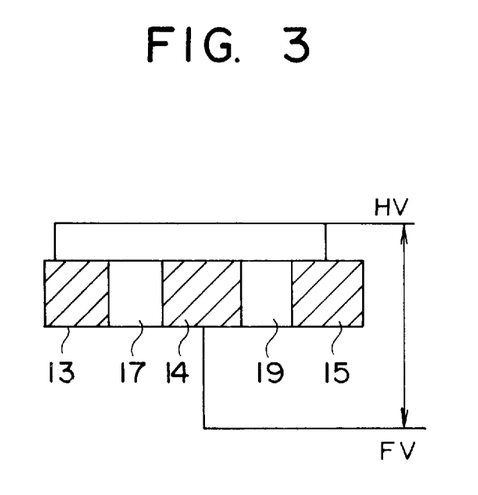
FIG. 3 is a model diagram of the electron gun of FIG. 1.

FIG. 3 is a model diagram of FIG. 1. In FIG. 3, reference numerals 13, 14 and 15 denote cylindrical electrodes like those of FIG. 1, and reference numerals 17 and 19 denote resistance ceramics.

Figure 4:
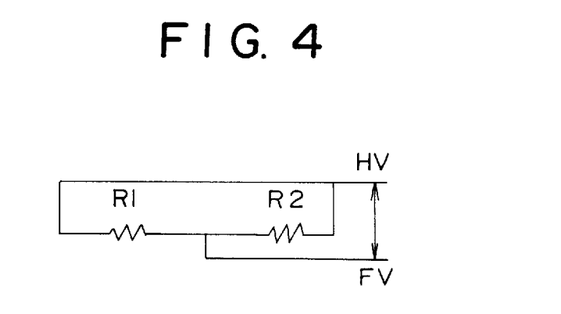
FIG. 4 is a diagram which shows, as an electric equivalent circuit, the electron gun of FIG. 1.

FIG. 4 shows an equivalent circuit of FIG. 3, and wherein R1 and R2 correspond to resistance ceramics 17 and 19. A resultant resistance Z between an anode voltage HV and a focusing voltage FV has a relationship $1/Z=(1/R1)+(1/R2)$.

Figure 5:
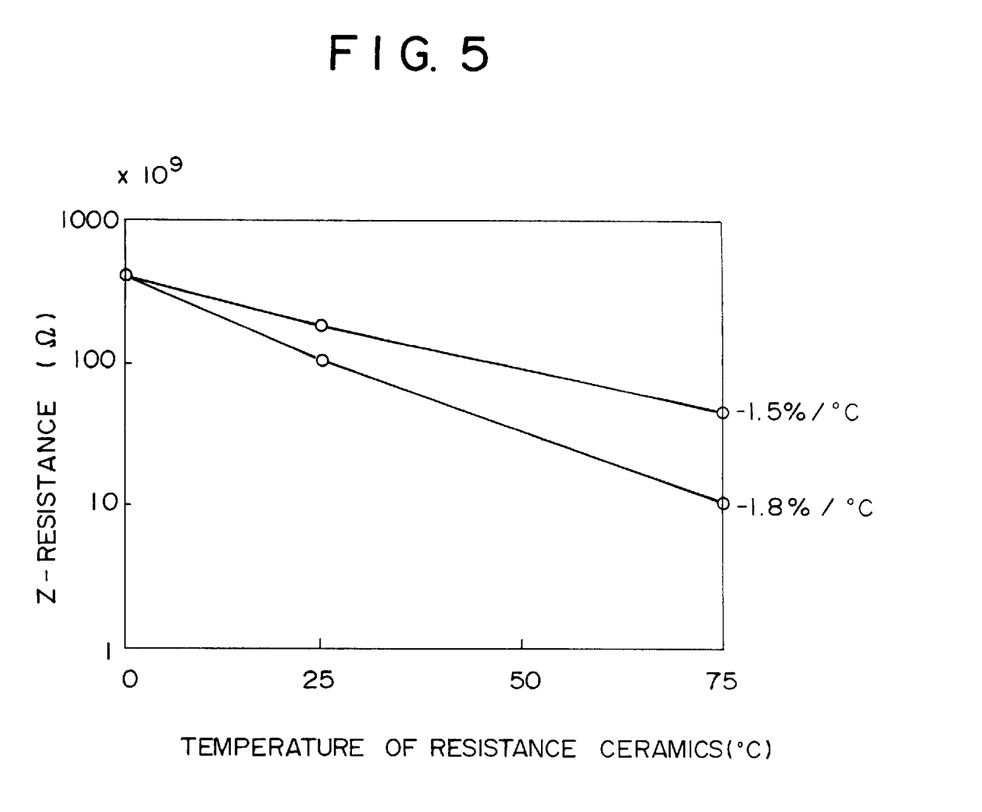
FIG. 5 is a graph showing a relationship between the resultant resistance and the temperature of the resistance ceramic.

FIG. 5 illustrates a relationship between the resultant resistance and the temperature of the resistance ceramics. The temperature of the resistance ceramics is that of when a thermal equilibrium is reached due to external atmosphere of the CRT, due to the heat generated by the CRT which is in operation (inclusive of that of yokes), and due to heat conduction and heat radiation from the CRT.

When the anode voltage HV is 33 KV, focusing voltage FV is 9 KV, ΔHV=HV–FV=24 KV. and Z-resistance is designed to be $400 \times 10^9$ Ω at 0° C., the Z-resistance becomes as shown in FIG. 5 with an increase in the temperature of the resistance ceramics. Table 3 shows part of the data represented by the graph of FIG. 5.

TABLE 3

| Temperature coefficient TCR (%/°C.) of vol. resistivity | Z-resistance ($\times 10^9$ Ω cm) | | | Rise of focusing potential (V) | | |
|---|---|---|---|---|---|---|
| | 0° C. | 25° C. | 75° C. | 0° C. | 25° C. | 75° C. |
| 1.80 | 400 | 100 | 10 | 0 | 6 | 60 |
| 1.50 | 400 | 170 | 41 | 0 | 3 | 14 |

From Table 3 above, when the temperature coefficients TCR of volume resistivity of the resistance ceramics are 1.8%/°C. and 1.5%/°C., Z-resistances at 75° C. are $10 \times 10^9$ Ω and $41 \times 10^9$ Ω. As the temperature of the resistance ceramics rises, the volume resistivity decreases, the current flowing into the focus pack circuit increases and the focusing potential rises. When the temperature coefficients TCR of volume resistivity of the resistance ceramics are 1.8%/°C. and 1.5%/°C., therefore, it will be understood that the focusing potentials at 75° C. are 60 V and 14 V. That is, a change (ΔFV) in the focusing potential decreases with a decrease in the TCR and, hence, the TCR of the ceramics plays an important role.

Figure 6:
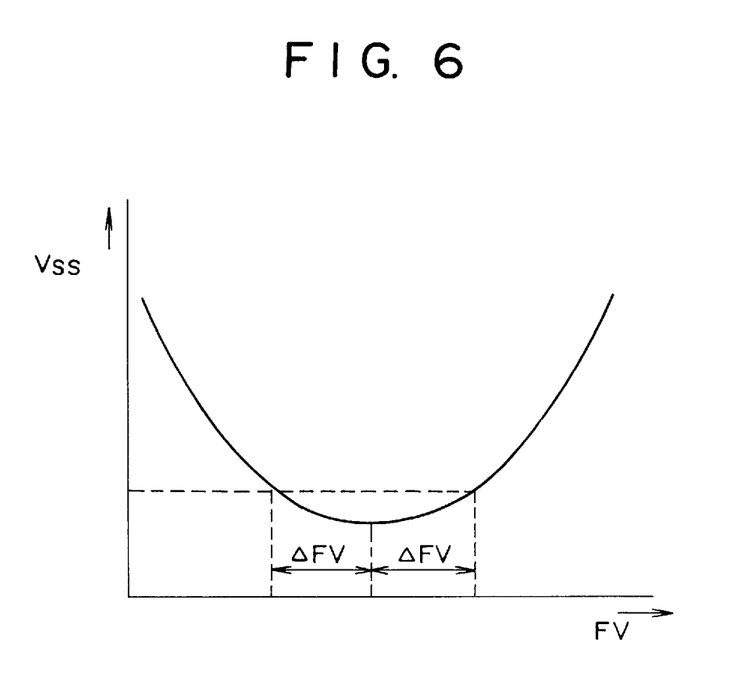
FIG. 6 is a graph showing a relationship between the visual spot size (VSS) and the change in the focusing potential ($\Delta FV$).

Visual spot size (VSS) due to a change in the focusing potential becomes as shown in FIG. 6, from which it is found that when a change (ΔFV) in the focusing potential is not larger than 60 V, VSS is little affected within a permissible range by the change in the focusing potential. That is, VSS can be suppressed to a sufficiently small level when the change (ΔFV) in the ocusing potential is not larger than 60 V.

By connecting the cylindrical electrodes 13 and 14 together and by connecting the cylindrical electrodes 14 and 15 together by using the resistance ceramic 17 of a particular composition containing alumina, titanium oxide, vanadium pentoxide, etc., the potential gradients can be relaxed as shown in the graph of FIG. 1 between the cylindrical electrodes 13 and 14 and between the cylindrical electrodes 14 and 15. Moreover, since the aluminous sintered product of the present invention has the absolute value of TCR which is not larger than 1.8%/°C., the change (ΔFV) in the focusing potential becomes not larger than 60 V, and whereby VSS is little affected by the change in the focusing voltage and can be decreased on the surface of the cathode-ray tube.

When the aluminuous sintered product of the present invention having the absolute value of TCR of not larger than 1.8%/°C. is incorporated in the electron gun, therefore, VSS can be decreased to be smaller than that of when conventional ceramics (samples Nos. 8, 16) having absolute values of TCR of not smaller than 1.8%/°C. are used.

As described above, the aluminous sintered product of the present invention exhibits a volume resistivity of from about $1 \times 10^7$ to about $1 \times 10^{13}$ Ω-cm over a temperature range of from 25° to 75° C. under the application of high voltages and an absolute value of the temperature coefficient of volume resistivity of not larger than 1.8%/°C. That is, the aluminuous sintered product of the invention exhibits a volume resistivity which lies between that of an insulator and that of an electric conductor and which varies in a reduced amount depending upon the temperature of the sintered product. Thus, any desired volume resistivity can be easily obtained.

By connecting the cylindrical electrodes in the electron gun using the aluminuous sintered product of the present invention, furthermore, the potential gradient can be relaxed among the cylindrical electrodes and, hence, visual spot size can be decreased on the surface of the cathode-ray tube making it possible to greatly improve brightness and vividness.

EXAMPLE 2

First, an alumina powder, a manganese dioxide powder, a powder of an oxide of an element of the Group 5a of periodic table and a powder of an oxide of a metal of the iron family were prepared, were weighed such that the compositions of the sintered products thereof were as shown in Tables 4 and 5, and were wet-mixed together using a rotary mill to prepare slurries which were then spray-dried to obtain starting materials for sintering. The starting materials were press-molded and were fired in the open air at temperatures as shown in Tables 4 and 5 for two hours in order to obtain disk-like sintered products having a diameter of 60 mm and a thickness of 3 mm. Both ends of the sintered products were polished so that the samples possessed a thickness of 2 mm.

TABLE 4

| | Composition (% by weight) | | | | | | Firing temp. (°C.) | Volume resistivity (cm) | | Temp. coefficient (%/°C.) |
|---|---|---|---|---|---|---|---|---|---|---|
| | | | | Components of additives (% by wt.) | | | | | | |
| | | | | Oxide of iron family | | Oxide of group 5a | | | | |
| Sample No. | $Al_2O_3$ | Additives | $MnO_2$ | Type | Amount | Type | Amount | | 25° C. | 75° C. | |
| *1 | 95.0 | 3.0 | 40.0 | $Fe_2O_3$ | 50.0 | $Nb_2O_5$ | 10.0 | 1400 | $8.4 \times 10^{14}$ | $7 \times 10^{12}$ | 1.82 |
| 2 | 93.0 | 7.0 | 40.0 | $Fe_2O_3$ | 50.0 | $Nb_2O_5$ | 10.0 | 1350 | $7.9 \times 10^{12}$ | $7.9 \times 10^{11}$ | 1.80 |
| 3 | 90.0 | 10.0 | 40.0 | $Fe_2O_3$ | 50.0 | $Nb_2O_5$ | 10.0 | 1350 | $3.1 \times 10^{12}$ | $4.3 \times 10^{11}$ | 1.72 |
| 4 | 85.0 | 15.0 | 40.0 | $Fe_2O_3$ | 50.0 | $Nb_2O_5$ | 10.0 | 1350 | $7.8 \times 10^{11}$ | $1.7 \times 10^{11}$ | 1.56 |
| 5 | 80.0 | 20.0 | 40.0 | $Fe_2O_3$ | 50.0 | $Nb_2O_5$ | 10.0 | 1300 | $2.5 \times 10^{10}$ | $6.2 \times 10^{9}$ | 1.48 |
| 6 | 70.0 | 30.0 | 40.0 | $Fe_2O_3$ | 50.0 | $Nb_2O_5$ | 10.0 | 1300 | $1.2 \times 10^{8}$ | $3.5 \times 10^{7}$ | 1.42 |
| *7 | 67.0 | 33.0 | 40.0 | $Fe_2O_3$ | 50.0 | $Nb_2O_5$ | 10.0 | 1250 | $1.0 \times 10^{7}$ | $3.2 \times 10^{8}$ | 1.36 |
| 8 | 85.0 | 15.0 | 65.0 | $Fe_2O_3$ | 20.0 | $Nb_2O_5$ | 15.0 | 1300 | $6.4 \times 10^{12}$ | $7.5 \times 10^{11}$ | 1.77 |
| 9 | 85.0 | 15.0 | 75.0 | $Fe_2O_3$ | 20.0 | $Nb_2O_5$ | 5.0 | 1300 | $8.2 \times 10^{12}$ | $8.8 \times 10^{10}$ | 1.79 |
| 10 | 85.0 | 15.0 | 20.0 | $Fe_2O_3$ | 75.0 | $Nb_2O_5$ | 5.0 | 1325 | $8.1 \times 10^{10}$ | $8.8 \times 10^{12}$ | 1.78 |
| 11 | 85.0 | 15.0 | 20.0 | $Fe_2O_3$ | 65.0 | $Nb_2O_5$ | 15.0 | 1325 | $4.4 \times 10^{12}$ | $5.5 \times 10^{11}$ | 1.75 |
| 12 | 85.0 | 15.0 | 47.5 | $Fe_2O_3$ | 47.5 | $Nb_2O_5$ | 5.0 | 1350 | $3.6 \times 10^{12}$ | $6.5 \times 10^{11}$ | 1.64 |
| 13 | 85.0 | 15.0 | 42.5 | $Fe_2O_3$ | 42.5 | $Nb_2O_5$ | 15.0 | 1350 | $6.3 \times 10^{11}$ | $1.1 \times 10^{11}$ | 1.65 |
| 14 | 75.0 | 25.0 | 53.0 | NiO | 7.0 | $Ta_2O_5$ | 40.0 | 1350 | $8.0 \times 10^{7}$ | $2.0 \times 10^{7}$ | 1.80 |

Samples marked with * lie outside the scope of the present invention

TABLE 5

| | Composition (% by weight) | | | | | | Firing temp. (°C.) | Volume resistivity (cm) | | Temp. coefficient (%/°C.) |
|---|---|---|---|---|---|---|---|---|---|---|
| | | | | Components of additives (% by wt.) | | | | | | |
| | | | | Oxide of iron family | | Oxide of group 5a | | | | |
| Sample No. | $Al_2O_3$ | Additives | $MnO_2$ | Type | Amount | Type | Amount | | 25° C. | 75° C. | |
| 15 | 80.0 | 20.0 | 90.0 | CoO | 7.0 | $V_2O_5$ | 3.0 | 1250 | $2.6 \times 10^{10}$ | $3.0 \times 10^{9}$ | 1.77 |
| *16 | 80.0 | 20.0 | 90.0 | CoO | 10.0 | — | | 1250 | $2.8 \times 10^{10}$ | $1.5 \times 10^{9}$ | 1.89 |
| 17 | 85.0 | 15.0 | 17.0 | $Fe_2O_3$ | 80.0 | $Mb_2O_5$ | 3.0 | 1350 | $6.6 \times 10^{7}$ | $1.5 \times 10^{7}$ | 1.55 |
| 18 | 85.0 | 15.0 | 15.0 | $Fe_2O_3$ | 45.0 | $Ta_2O_5$ | 40.0 | 1320 | $8.3 \times 10^{12}$ | $2.0 \times 10^{12}$ | 1.52 |
| 19 | 90.0 | 10.0 | 75.0 | CoO | 5.0 | $V_2O_5$ | 20.0 | 1400 | $7.4 \times 10^{12}$ | $9.2 \times 10^{11}$ | 1.75 |
| 20 | 80.0 | 20.0 | 87.0 | $NiO_2$ | 9.0 | $V_2O_5$ | 4.0 | 1300 | $8.5 \times 10^{7}$ | $2.2 \times 10^{7}$ | 1.48 |
| 21 | 83.0 | 17.0 | 26.0 | CoO | 44.0 | $Ta_2O_5$ | 30.0 | 1300 | $1.3 \times 10^{11}$ | $3.3 \times 10^{10}$ | 1.49 |
| 22 | 87.0 | 13.0 | 31.0 | NiO | 46.0 | $Nb_2O_5$ | 23.0 | 1350 | $7.6 \times 10^{11}$ | $9.2 \times 10^{10}$ | 1.76 |
| 23 | 90.0 | 10.0 | 31.0 | CoO | 53.5 | $Nb_2O_5$ | 15.5 | 1380 | $5.2 \times 10^{12}$ | $7.5 \times 10^{11}$ | 1.71 |
| 24 | 80.0 | 20.0 | 40.0 | $Fe_2O_3$ | 27.0 | $Nb_2O_5$ | 33.0 | 1300 | $4.2 \times 10^{11}$ | $8.6 \times 10^{10}$ | 1.59 |

Samples marked with * lie outside the scope of the present invention

Next, the samples were placed in vacuum of about $10^{-6}$ torr. based on a method of measuring insulation resistance specified under JIS C 2141, and terminals of an ultra-insulation resistance tester were connected to the electrodes on both surfaces of the samples. After the temperature in the vacuum device has reached any desired temperature of 25° C. or 75° C., the samples were left to stand for 10 minutes and, then, a voltage of 1000 V was applied to the samples for 5 minutes to read the resistance. The volume resistivity was calculated from the resistance in order to find a temperature coefficient of volume resistivity. As specified under JIS C 2141, the volume resistivity was found according to $R = r \times S/t$ (R: volume resistivity, r: resistance, S: area of electrode, t: thickness of sample). The temperature coefficient TCR of volume resistivity (%/°C.) was found in compliance with TCR $(\%/°C.) = [(R_{25} - R_{75})/(R_{25} \times 50)] \times 100$, where $R_{25}$ denotes a volume resistivity at 25° C. and $R_{75}$ denotes a volume resistivity at 75° C. The results were as shown in Tables 4 and 5.

It will be understood from Tables 4 and 5 that the aluminous sintered product of the present invention exhibits a volume resistivity of from $1 \times 10^7$ to $1 \times 10^{13}$ Ω-cm over a temperature range of from 25° to 75° C. and an absolute value of the temperature coefficient of volume resistivity of not larger than 1.8%/°C. over a temperature range of from 25° to 75° C. On the other hand, samples Nos. 1 and 7 lying outside the scope of the present invention fail to exhibit volume resistivities that lie within the range of from $1 \times 10^7$ to $1 \times 10^{13}$ Ω-cm over a temperature range of from 25° to 75° C. Furthermore, the samples Nos. 1 and 16 have the temperature coefficients of volume resistivity of larger than 1.8%/°C. over the temperature range of from 25° to 75° C.

In order to obtain a desired resistance, the aluminuous sintered product has heretofore been fired in a reducing atmosphere resulting in an increase in the manufacturing cost. According to the present invention, however, the aluminuous sintered product is fired in the open air; i.e., the aluminuous sintered product having a desired resistance is obtained at a reduced cost.

As described above, the aluminous sintered product of the present invention exhibits a volume resistivity of from about $1 \times 10^7$ to about $1 \times 10^{13}$ Ω-cm over a temperature range of from 25° to 75° C. and a temperature coefficient of volume resistivity of not larger than 1.8%/°C. over a temperature range of from 25° to 75° C. That is, the aluminuous sintered product of the invention exhibits a volume resistivity which lies between that of an insulator and that of an electric conductor and which varies in a reduced amount depending upon the temperature of the sintered product. Thus, any desired volume resistivity can be easily obtained lending the aluminuous sintered product itself well for being used as antistatic part (e.g., part that must not be electrostatically charged such as conveyer arm, handling jig, tweezers for holding a wafer used in an apparatus for producing semiconductors), resistance substrate, electrically conducting material, contact, heater and outer wall of vacuum tubes.

We claim:

1. An aluminous sintered product comprising 75 to 85% by weight of an alumina component and 15 to 25% by weight of additives, said additives including at least one selected from oxides of elements of Group 5a of the periodic table and at least one selected from oxides of iron, cobalt, nickel, manganese, titanium, calcium, magnesium, chromium and silicon, and said aluminous sintered product exhibiting a volume resistivity of from $1 \times 10^7$ to $1 \times 10^3$ Ω-cm over a temperature range of from 25° to 75° C. and an absolute value of the temperature coefficient of volume resistivity of not larger than 1.8%/°C. under the application of high voltages, wherein the additives include vanadium pentoxide, titanium oxide and at least the one selected from calcium oxide, chromium oxide, cobalt oxide, magnesium oxide, silica, manganese oxide and iron oxide, the vanadium pentoxide being contained in an amount of from 0.1 to 1.0% by weight, the titanium oxide being contained in an amount of from 1 to 20% by weight, and the remainder being at least one selected from calcium oxide, chromium oxide, cobalt oxide, magnesium oxide, silica, manganese oxide, and iron oxide.

2. An aluminous sintered product comprising 75 to 85% by weight of an alumina component and 15 to 25% by weight of additives, said additives including at least one selected from oxides of elements of Group 5a of the periodic table and at least one selected from oxides of iron, cobalt, nickel, manganese, titanium, calcium, magnesium, chromium and silicon, and said aluminous sintered product exhibiting a volume resistivity of from $1 \times 10^7$ to $1 \times 10^3$ Ω-cm over a temperature range of from 25° to 75° C. and an absolute value of the temperature coefficient of volume resistivity of not larger than 1.8%/°C. under the application of high voltages, wherein said aluminous sintered product contains vanadium pentoxide in an amount of from 0.2 to 0.3% by weight, titanium oxide in an amount of from 3.0 to 15.0% by weight, and at least one selected from calcium oxide, chromium oxide, cobalt oxide, magnesium oxide, silica, manganese oxide and iron oxide in an amount of from 3.0 to 20.0% by weight.

3. An aluminous sintered product comprising 75 to 85% by weight of an alumina component and 15 to 25% by weight of additives, said additives including at least one selected from oxides of elements of Group 5a of the periodic table and at least one selected from oxides of iron, cobalt, nickel, manganese, titanium, calcium, magnesium, chromium and silicon, and said aluminous sintered product exhibiting a volume resistivity of from $1 \times 10^7$ to $1 \times 10^3$ Ω-cm over a temperature range of from 25° to 75° C. and an absolute value of the temperature coefficient of volume resistivity of not larger than 1.8%/°C. under the application of high voltages, wherein said additives include at least one selected from oxides of elements of Group 5a of the periodic table, at least one selected from iron oxide, cobalt oxide, nickel oxide, and manganese dioxide, and wherein when the total amount of the additives is regarded to be 100% by weight, the oxide of the element of Group 5a of the periodic table is contained in an amount of from 3 to 40% by weight, the at least one selected from iron oxide, cobalt oxide and nickel oxide is contained in an amount of from 5 to 80% by weight, and manganese dioxide is contained in an amount of from 15 to 90% by weight.

4. An aluminous sintered product comprising 80 to 85% by weight of an alumina component and 15 to 20% by weight of additives, said additives including at least one selected from oxides of elements of Group 5a of the periodic table and at least one selected from oxides of iron, cobalt, nickel, manganese, titanium, calcium, magnesium, chromium and silicon, said aluminous sintered product exhibiting a volume resistivity of from $1 \times 10^7$ to $1 \times 10^{13}$ Ω-cm over a temperature range of from 25° to 75° C. and an absolute value of the temperature coefficient of volume resistivity of not larger than 1.8%/°C. under the application of high voltage, wherein when the total amount of said additives is regarded to be 100% by weight, said additives include niobium oxide in an amount of from 5 to 15% by weight, iron oxide in an amount of from 27 to 65% by weight and manganese dioxide in an amount of from 26 to 65% by weight.

* * * * *